(12) United States Patent
Faraj et al.

(10) Patent No.: US 10,598,858 B2
(45) Date of Patent: Mar. 24, 2020

(54) FIBER OPTIC CONNECTION DEVICE WITH AN IN-LINE SPLITTER

(71) Applicant: CORNING OPTICAL COMMUNICATIONS LLC, Hickory, NC (US)

(72) Inventors: Patrick Faraj, Berlin (DE); Joseph Clinton Jensen, Lawndale, NC (US); Kristine Alaina Johnson, Keller, TX (US); Antwan Joco'ques Works, Lewisville, TX (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/225,221

(22) Filed: Dec. 19, 2018

(65) Prior Publication Data

US 2019/0121029 A1    Apr. 25, 2019

Related U.S. Application Data

(63) Continuation of application No. PCT/US2017/037401, filed on Jun. 14, 2017.

(Continued)

(51) Int. Cl.
*G02B 6/28* (2006.01)
*G02B 6/30* (2006.01)
(Continued)

(52) U.S. Cl.
CPC ......... *G02B 6/2808* (2013.01); *G02B 6/0218* (2013.01); *G02B 6/28* (2013.01);
(Continued)

(58) Field of Classification Search
CPC .................................................. G02B 6/2808
See application file for complete search history.

(56) References Cited

U.S. PATENT DOCUMENTS 5,444,804 A    8/1995  Yui et al.
5,708,741 A    1/1998  Deveau
(Continued)

FOREIGN PATENT DOCUMENTS

JP    11202157 A    7/1999

OTHER PUBLICATIONS

International Search Report and Written Opinion of the International Searching Authority; PCT/US2017037401 dated Sep. 13, 2017; 13 Pages; European Patent Office.

*Primary Examiner* — Sung H Pak
(74) *Attorney, Agent, or Firm* — Michael E. Carroll, Jr.

(57) ABSTRACT

A fiber optic connection device having a casing with a first end and a second end is disclosed. An optical splitter is positioned in the casing and has an input proximal to the first end of the casing and an output proximal to the second end of the casing. A first optical interface is located adjacent to the first end and is in optical communication with the input of the optical splitter. The first optical interface includes a first optical fiber interconnection point. A second optical interface is located adjacent the second end of the casing and is in optical communication with the output of the optical splitter. The second optical interface includes a second optical fiber interconnection point. In some embodiments, the casing may provide protection from environmental elements.

43 Claims, 8 Drawing Sheets

Related U.S. Application Data

(60) Provisional application No. 62/355,371, filed on Jun. 28, 2016.

(51) Int. Cl.
*G02B 6/44* (2006.01)
*G02B 6/02* (2006.01)

(52) U.S. Cl.
CPC ............ *G02B 6/30* (2013.01); *G02B 6/4466* (2013.01); *G02B 6/4471* (2013.01)

(56) References Cited

U.S. PATENT DOCUMENTS

| | | | |
|---|---|---|---|
| 7,773,851 B2 * | 8/2010 | Castonguay | G02B 6/125 385/140 |
| 9,791,628 B2 * | 10/2017 | Qi | H04Q 11/0001 |
| 9,971,093 B2 | 5/2018 | Makrides-Saravanos | |
| 2006/0165366 A1 | 7/2006 | Feustel et al. | |
| 2007/0003205 A1 | 1/2007 | Saravanos et al. | |
| 2008/0298742 A1 | 12/2008 | Bresniker et al. | |
| 2008/0298748 A1 * | 12/2008 | Cox | G02B 6/125 385/46 |
| 2009/0052842 A1 * | 2/2009 | Draxler | B32B 37/12 385/46 |
| 2010/0303431 A1 | 12/2010 | Cox et al. | |
| 2012/0177328 A1 | 7/2012 | Marcouiller et al. | |
| 2015/0016788 A1 | 1/2015 | Buff et al. | |

\* cited by examiner

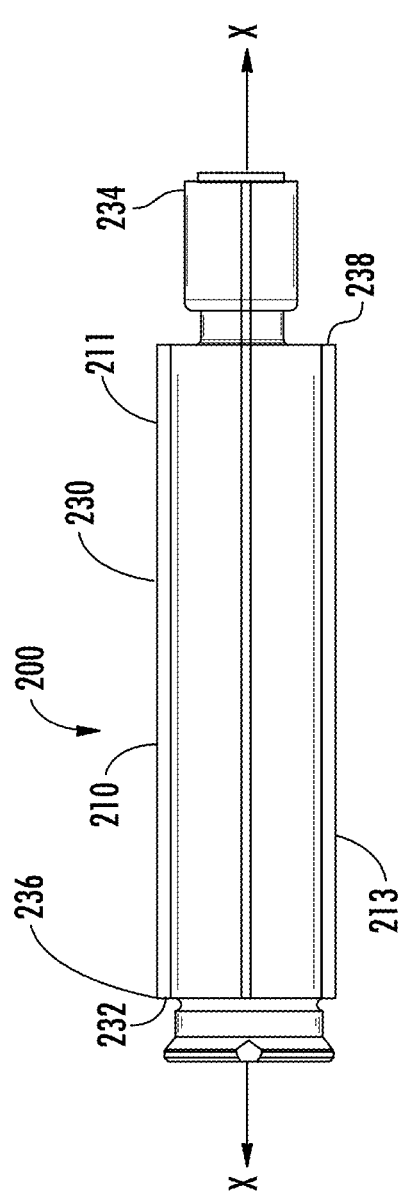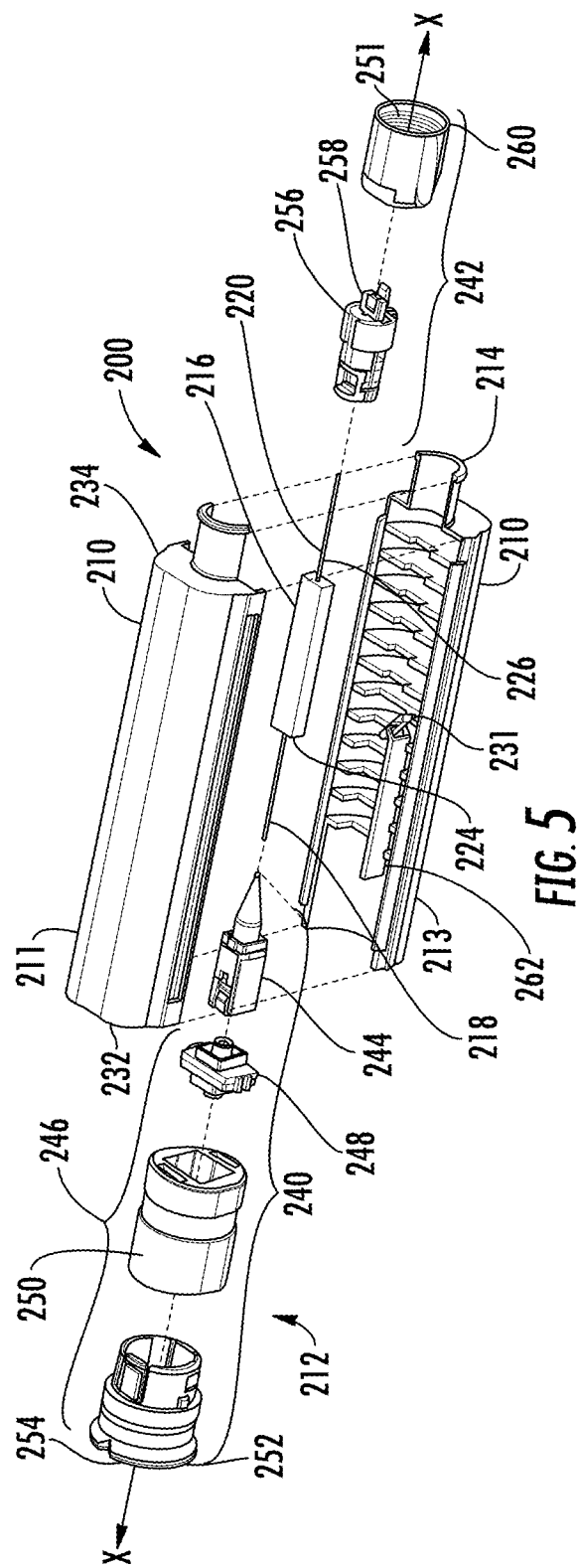

FIBER OPTIC CONNECTION DEVICE WITH AN IN-LINE SPLITTER

CROSS-REFERENCE TO RELATED APPLICATIONS

This application is a continuation of International Application No. PCT/US17/37401, filed on Jun. 14, 2017, which claims the benefit of priority to U.S. Application No. 62/355,371, filed on Jun. 28, 2016, both applications being incorporated herein by reference.

FIELD

The disclosure relates generally to fiber optic connection devices, including optical signal splitters, and more particularly to a fiber optic connection device with an optical signal splitter positioned in-line with fiber optic connectors for use in fiber optic networks.

BACKGROUND

As a result of the ever-increasing demand for broadband communications involving voice, video and data transmission, telecommunication and cable media service providers and/or operators have increasingly relied on fiber optics to provide large bandwidth telecommunication service to their subscribers. Fiber optic solutions have become the main part of telecommunication networks. Optical cables can transmit voice, data and video signals over very long distances at very high speed. Because of this, developments in fiber optic telecommunication networks have consistently focused on extending the optical fiber closer to the subscriber to the point that currently the subscriber can be connected directly to the fiber optic network through FTTx (fiber to the specific location "x") technology, including FTTH technology (fiber-to-the-home), which provides an "all optical" communication network right to the subscribers at their homes. This deployment of optical fiber toward the subscriber is being driven by ever-increasing demand for more bandwidth, whether the optical fiber reaches all the way to the subscriber or not.

However, the subscriber's home may not be a separate, free-standing house, but an apartment building, referred to as a multiple dwelling unit (MDU). The apartment buildings may be very old and were built during a time when no one ever dreamed of broadband communications, fiber optic networks, or the internet. In addition, construction techniques, materials and building codes may have been significantly different from what they are today. Moreover, there are different kinds of MDUs, each kind requiring different types of complicated cabling systems to retrofit a fiber optic network in the MDU. Typically, separate cables are used with each cable connected to one subscriber. Installation of many cables which provide the connection between a main distribution point (which usually is located in the basement or in another place of the building) and the subscriber may cause significant and numerous problems with routing through the wall or levels of the building, in addition to mounting and installing fiber optic equipment. As a result, such installations consume a lot of time and costs, particularly with regard to retrofitting such a network in existing buildings having current tenants.

Referring to FIG. 1, there is shown a conventional fiber optic network 100 installed in a typical MDU. The MDU 110 has multiple floors or distribution levels 112, four of which are shown in FIG. 1. Each floor 112 is provided optical service by a riser cable 114 extending vertically from a lower floor 112, which may be a basement (not shown in FIG. 1). The riser cable 114 has spaced apart access points 116 which may be set at the factory. In FIG. 1, the access points 116 have been set to align with each floor 112, but the access points 116 may be set for any appropriate spacing, for example, every other floor 112 based on the number of subscribers per floor 112 or to accommodate the architectural structure of the MDU 110.

The access point 116 may be a FlexNAP™ system provided by Corning Optical Communications LLC of Hickory, N.C. At the access point 116 one or more optical fibers of the riser cable 114 separate or are tapped off from the riser cable 114 by a tether cable 118 which routes to a distribution box 120 located at the particular floor 112. The distribution box 120 may be a fiber distribution terminal (FDT) or may be a local convergence point (LCP). In the case of an FDT, the tether cable 118 may be a multi-fiber cable and the distribution box 120 may be used to interconnect each optical fiber in the tether cable 118 to an optical fiber in a subscriber drop cable 122, which routes to a subscriber premises 124 to provide optical communication service to that particular subscriber. In such case, the distribution box 120 will have a patch panel to make such interconnections. Alternatively, the distribution box 120 may include an optical splitter 126 and function as an LCP. Instead of the optical fiber in the tether cable 118 being directly connected to an optical fiber in the subscriber drop cable 122, the optical fiber is connected to the optical splitter 126 which splits the optical signal in the optical fiber into multiple optical signals. Each of the split optical signals is carried by a separate optical fiber and interconnects with an optical fiber in the subscriber drop cable 122 routed to the subscriber premises 124.

An LCP is shown in the break-out detail in FIG. 1. Referring to the detail, the tether cable 118 separates from the riser cable 114 at the access point 116 and extends toward the optical splitter 126. It should be noted that, although the riser cable 114 and the access point 116 are shown being routed within the distribution box 120, the riser cable 114 and the access point 116 may be positioned outside of the distribution box 120, and, may even be located outside of the MDU 110 and be exposed to environmental elements. The optical splitter 126 and input terminal blocks 128 may be positioned in a separate section or sub-enclosure 130 of the distribution box 120. The tether cable 118 may enter the sub-enclosure 130 through a port or be connected into the sub-enclosure by a suitable fiber optic connector 132. An optical fiber 134 from the tether cable 118 connects to the optical splitter 126 through input terminal blocks 128 by way of input optical fiber 136. The optical splitter 126 splits the optical signal carried by the input optical fiber 136 into multiple optical signals. In the detail for FIG. 1, the optical splitter 126 splits the optical fiber into four optical signals each of which is carried by a separate output optical fiber 138. The output optical fibers 138 route to output terminal blocks 140 and interconnect to the output fibers 142. Each output 142 may be included in a subscriber drop cable 122 with individual subscriber drop cables 122 bundled together into a bundled drop cable 144 using a helical wrap. The bundled drop cable 144 and, therefore, the subscriber drop cables 122 connect to the distribution box 120 through a multi-fiber connector 146 and extend to the subscriber premises 124. A drop box 148 at the subscriber premises 124 receives the bundled drop cable 144 and one of the subscriber drop cables 122 separates from the bundled drop cable 144 and routes to the subscriber premises 124.

Whether the distribution box 120 is a FDT or a LCP, sufficient space on the floor 112 is required for mounting and installing the distribution box 120, and for connecting the tether cable 118 and the subscriber drop cable 122 to the distribution box 120. This requirement becomes costly, not only with respect to the material necessary for each floor 112, but also, for the labor involved with such installation. This is particularly applicable in the event the fiber optic network is being retrofitted into an existing MDU, and increasingly problematic the older the MDU.

Consequently, there is an unresolved need for devices that provide better options for optical fiber deployments.

No admission is made that any reference cited herein constitutes prior art. Applicant expressly reserves the right to challenge the accuracy and pertinence of any cited documents.

SUMMARY

One embodiment of the disclosure relates to a fiber optic connection device having a casing with a first end and a second end. The fiber optic connection device also comprises an optical splitter positioned in the casing and having an input proximal to the first end of the casing and an output proximal to the second end of the casing. The fiber optic connection device also comprises a first optical interface located adjacent to the first end and in optical communication with the input of the optical splitter. The first optical interface comprises a first optical fiber interconnection point. The fiber optic connection device also comprises a second optical interface located adjacent the second end of the casing and in optical communication with the output of the optical splitter. The second optical interface comprises a second optical fiber interconnection point. Another embodiment of the disclosure relates to a fiber optic connection device comprising a casing having a longitudinal axis therethrough and an outer surface. The casing comprises a first end and a second end. The first end and the second end are positioned in opposition on the longitudinal axis of the casing. The fiber optic connection device also comprises an optical splitter positioned in the casing generally aligned with the longitudinal axis between the first end and the second end. The optical splitter has at least one first waveguide extending from the optical splitter toward the first end, and a plurality of second waveguides extending from the optical splitter toward the second end. The fiber optic connection device also comprises a single fiber connector accessible through the first end and in optical communication with the at least one first waveguide. The fiber optic connection device also comprises a multi-fiber connector accessible through the second end and in optical communication with the plurality of second waveguides. The casing is sealed to protect against environmental elements.

Yet another embodiment of the disclosure relates to a fiber optic connection device. The fiber optic connection device also comprises a casing comprising a longitudinal axis therethrough, an outer surface and an inner surface. The casing comprises a first end and a second end. The fiber optic connection device also comprises an optical splitter positioned in the casing generally aligned with the longitudinal axis, and having at least one first optical fiber extending from the optical splitter toward the first end, and a plurality of second optical fibers extending from the optical splitter toward the second end. The fiber optic connection device also comprises a first optical interface located adjacent the first end and in optical communication with the first optical fiber. The first optical interface comprises a first optical fiber interconnection point. The fiber optic connection device also comprises a second optical interface located adjacent the second end and in optical communication with the plurality of second optical fibers. The second optical interface comprises a second optical fiber interconnection point. The fiber optic connection device also comprises a bend control compensator mounted to the casing adjacent to the first end.

Yet still another embodiment of the disclosure relates to a method of making a fiber optic connection device. The method includes positioning an optical splitter in a casing having a first end and a second end, wherein the optical splitter has an input proximal to the first end and an output proximal to the second end. The method also includes locating a first optical interface adjacent to the first end, wherein the first optical interface is in optical communication with the input of the optical splitter, and wherein the first optical interface comprises a first optical fiber interconnection point. The method also includes locating a second optical interface adjacent to the second end, wherein the second optical interface is in optical communication with the output of the optical splitter, and wherein the second optical interface comprises a second optical fiber interconnection point. The method also includes sealing the casing against environmental elements.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 4 is a plan view of the fiber optic connection device of FIG. 2 shown in an assembled configuration.

FIG. 5 is an exploded perspective view of the fiber optic device of FIG. 4 including a casing, an optical splitter, a first interconnection point, and a second interconnection point;

DETAILED DESCRIPTION

Figure 1:
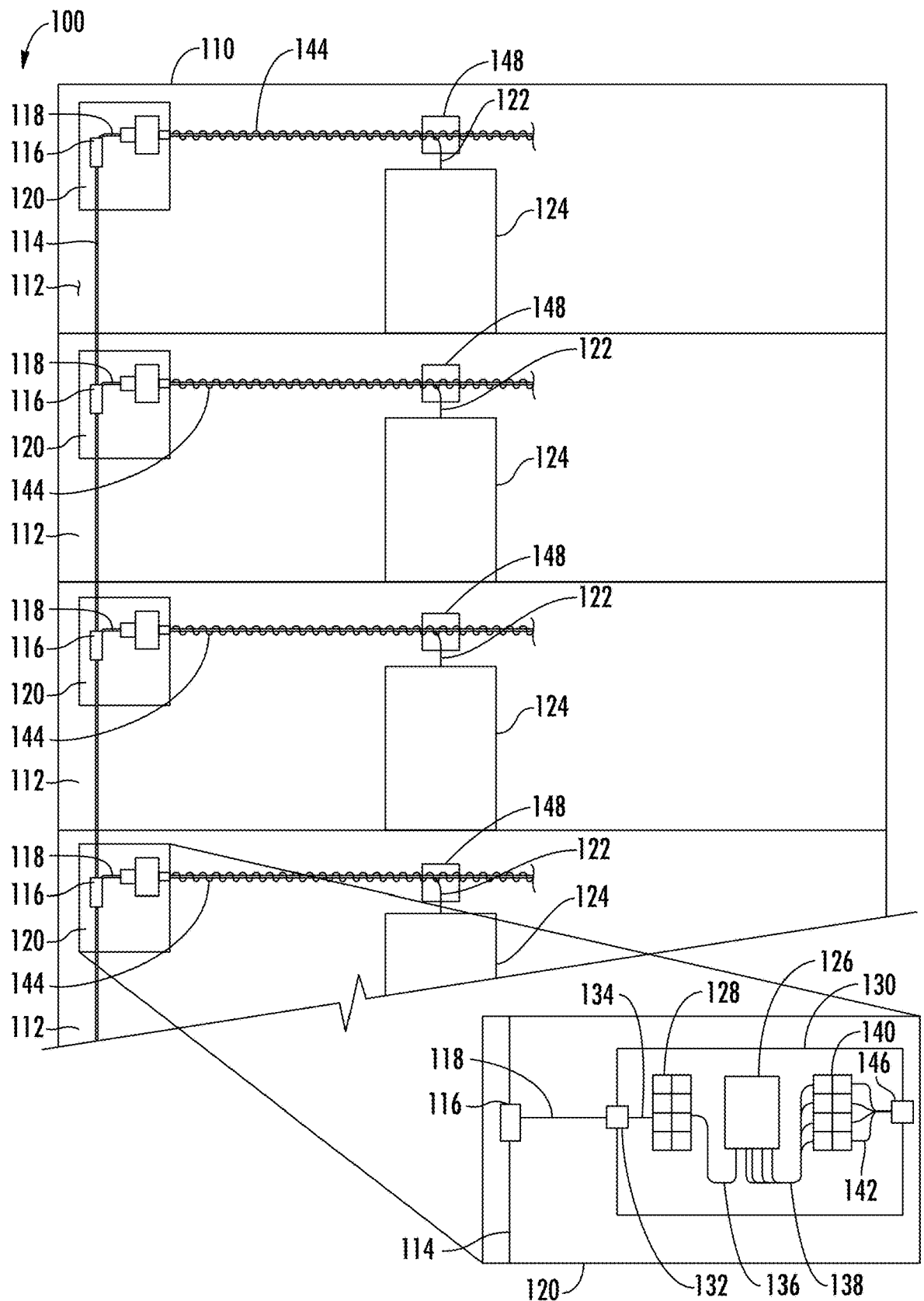
FIG. 1 is a partial elevation view a multiple dwelling unit (MDU) with a fiber optic network according to the prior art installed therein and connecting subscriber premises located on several floors to optical communication service.
Figure 2:
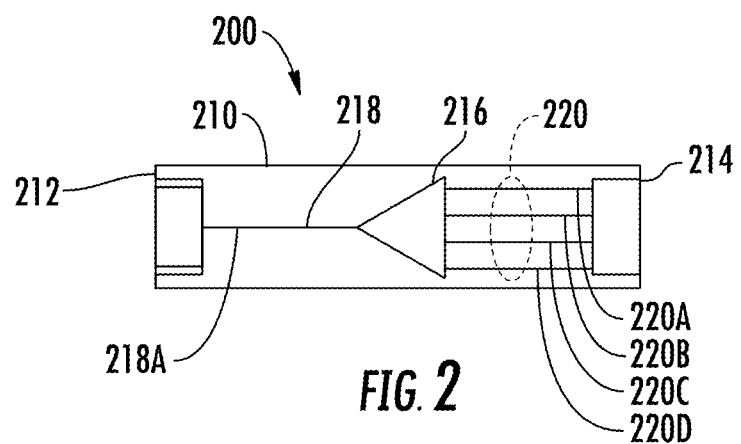
FIG. 2 is a schematic diagram of a fiber optic device having an optical splitter integrated in-line with fiber optic connectors according to an exemplary embodiment.

Referring now to FIG. 2, there is shown a schematic diagram of a fiber optic connection device 200. The fiber optic connection device 200 has a casing 210, a first optical interface 212, a second optical interface 214 and an optical splitter 216 positioned in the casing 210 and aligned with the first optical interface 212 and the second optical interface 214. The optical splitter 216 has a first waveguide 218 and a second waveguide 220, with the first optical interface 212 in optical communication with the first waveguide 218 and the second optical interface 214 in optical communication with the second optical waveguide 220. In FIG. 2, the first waveguide 218 is shown as having one optical signal 218A and the second waveguide 220 is shown as having four optical signals 220A, 220B, 220C, 220D. In this regard, the optical splitter 216 is shown as splitting the optical signal 218A into four optical signals 220A, 220B, 220C, 220D. In this sense, the first waveguide 218 may be considered as carrying non-split optical signal(s) and the second waveguide 220 may be considered as carrying split optical signals. For purposes of this description, the term "input" is used to denote and relate to an interface of the optical splitter 216 directed to the non-split optical signal(s), and, accordingly, as related to the first waveguide 218 and associated optical fibers and cables. The term "output" is used to denote and relate to an interface of the optical splitter 216 directed to the split optical signals, and, accordingly as related to the second waveguide 220 and associated optical fibers and cable. However, it should be understood that the optical splitter 216 is a bi-directional device, and the terms "input" and "output" are used only for convenience purposes and are not intended to limit the bi-directionality of the optical splitter 216. In other words, the optical splitter 216 may also be viewed as combining optical signals, in which case the split optical signals may be considered as an input to the optical splitter 216 and the non-split optical signal(s) may be considered as an output to the optical splitter 216.

Figure 3:
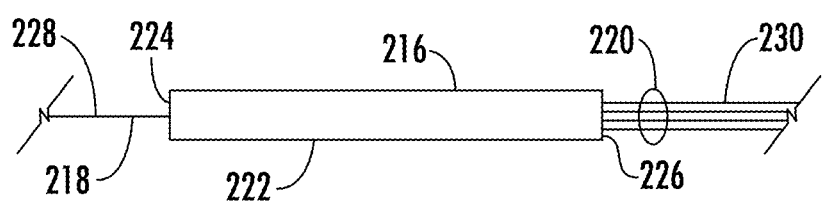
FIG. 3 is a plan view of the optical splitter of FIG. 2, comprising a splitter housing and first waveguide and second waveguide connected thereto.

Referring now to FIG. 3, a plan view of the optical splitter 216 having a splitter housing 222 is shown. The first waveguide 218 extends from the splitter housing 222 as an input 224 to the optical splitter 216, and the second waveguide 220 extends from the splitter housing 222 as an output 226 to the optical splitter 216. With reference now also to FIG. 2, the optical splitter 216 may be determined to have a "M:N" split ratio, where "M" is the number of optical signals of the first waveguides 218 of the input 224, and "N" is the number of optical signals of the second waveguides 220 of the output 226. The number "M" may be one or greater, and the number "N" may be selected from one of 4, 8, 16 and 32. Each optical signal may be carried by individual optical fibers. As such, the first waveguide 218 may include a first optical fiber 228, which may be one optical fiber or multiple optical fibers. For example, the first optical fiber 228 may include one or two 250-micron optical fibers, or fabricated with 900-micron tight buffer. The second waveguide 220 may include a second optical fiber 230, which may be one optical fiber or multiple optical fibers. Since the second optical fiber 230 may include 4, 6, 8, 16 or 32 optical fibers, the second optical fiber 230 may be ribbonized and in combinations of 4 or 8 optical fibers, or any other suitable ribbon combination. In FIG. 3, the first optical fiber 228 is shown as one optical fiber and the second optical fiber 230 is shown as ribbonized with multiple optical fibers.

Referring now to FIG. 4, there is shown an external plan view of the fiber optic connection device 200 in the assembled state. The casing 210 may be an casing 210 with a longitudinal axis, designated "x", extending therethrough, with the casing 210 having an outer surface 230 and an inner surface 231 (not visible in FIG. 4). The casing 210 may be formed by a first shell 211 and a second shell 213 joined together, as shown in FIG. 5. The casing 210 includes a first end 232 and a second end 234. The first end 232 and the second end 234 are positioned in opposition on the longitudinal axis "x" of the casing 210. The fiber optic connector device 200 has a relatively small footprint in both length and outer form-factor. The maximum length of the casing 210 may be about 200 millimeters or less. The maximum outer transverse cross-sectional dimension of the casing 210 may be about 40 millimeters or less. The casing 210 may be sealed to protect against environmental elements as needed for the desired application. For instance, outdoor applications may require robust sealing and indoor application may not require any sealing whatsoever. Sealing the casing 210 may include, without limitation, using overmold construction, disposing potting material in the casing 210, or applying heat-shrink material to the casing 210. The first end 232 has a first outer rim 236 and the second end 234 has a second outer rim 238. At least one or both of the first outer rim 236 and the second outer rim 238 is curved radially inward toward the longitudinal axis "x". Radially curved first outer rim 236 and/or second outer rim 238 facilitate installation of the fiber optic connection device 200 by reducing the risk of the fiber optic connection device 200 catching on exposed or protruding fasteners or other material in conduits, raceways or other structural aspects during installation of the fiber optic connector device 200, particularly in a multiple dwelling unit (MDU), and especially in a retrofit installation. In this regard, the fiber optic connection device 200 can be pre-connected to the access point of a riser cable and installed with the riser cable as the riser cable is paid out in the MDU. Connecting the fiber optic connection device 200 to an access point will be discussed in more detail below.

Figure 6:
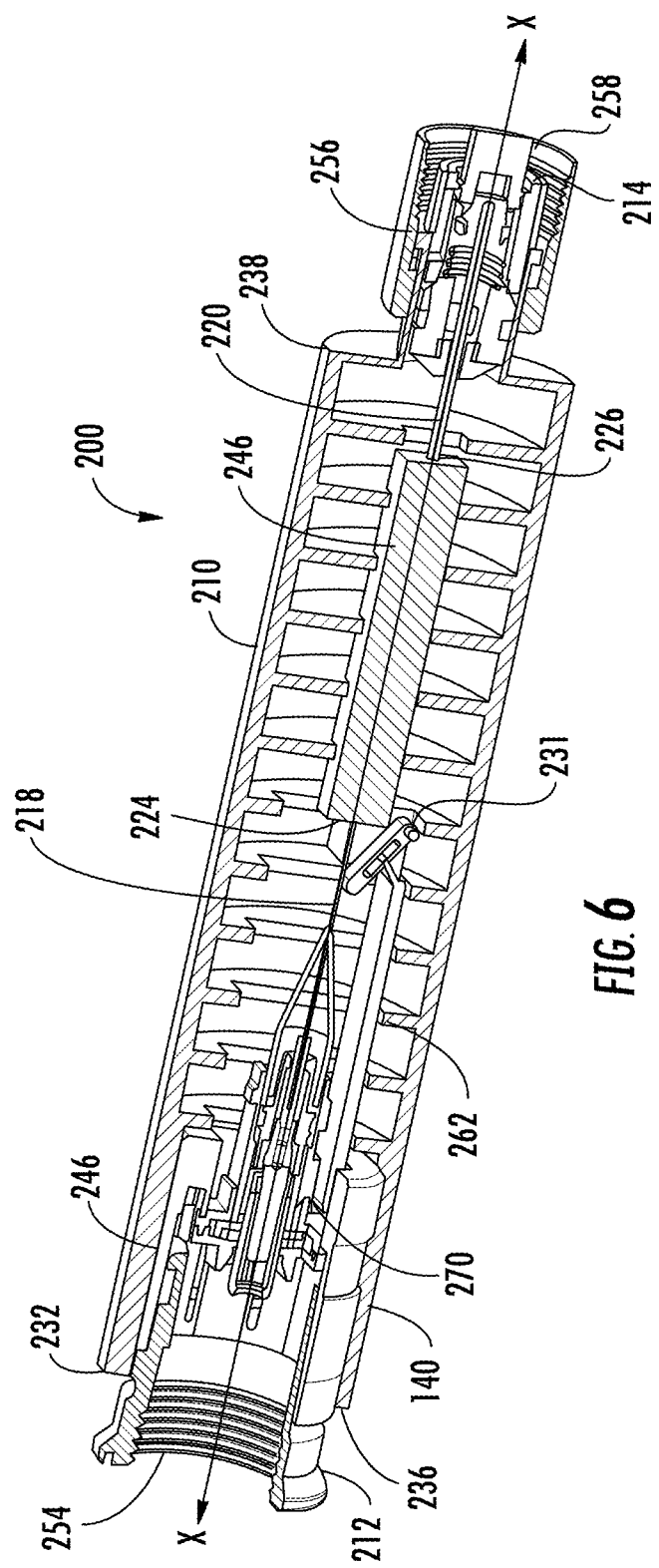
FIG. 6 is a cross-sectional view of the fiber optic device of FIG. 5 shown in an assembled configuration.

Turning now to FIGS. 5 and 6, there is shown exploded, perspective and cross-sectional views, respectively, of the fiber optic connection device 200 with the casing 210 having the first shell 211, the second shell 213, first end 232 and second end 234. Optical splitter 216 is positioned in the casing 210 with the input 224 proximal to the first end 232 of the casing 210 and with the output 226 proximal to the second end 234 of the casing 210. The first optical interface 212 is located adjacent to the first end 232 and is in optical communication with the input 224 of the optical splitter 216. The first optical interface 212 is in optical communication with the input 224 of the optical splitter 216 through the first waveguide 218. The first optical interface 212 includes a first optical fiber interconnection point 240. The second optical interface 214 is located adjacent the second end 234 of the casing 210 and is in optical communication with the output 226 of the optical splitter 216. The second optical interface 214 is in optical communication with the output 226 of the optical splitter 216 through the second waveguide 220. The second optical interface 214 includes a second optical fiber interconnection point 242. The first optical interface 212 is in-line with the second optical interface 214 and faces in opposite directions.

The first optical fiber interconnection point 240 may include a first fiber connector 244 and a first fiber optic adapter 246. The first fiber connector 244 may be a single-fiber connector, and may be any suitable connector, such as non-limiting examples, an SC connector, LC connector or ST connector for single fibers. Moreover, the first interconnection point may have any suitable mechanism or structure for securing a mating optical connection such as a push-pull mechanism, a latching mechanism, a bayonet mechanism, a threaded mechanism or the like.

An SC connector is shown in FIGS. 5 and 6 as an explanatory embodiment. In this embodiment, the first fiber optic adapter 246 may be a hardened adapter such as an OptiTap® adapter as provided by Corning Optical Communications LLC, Hickory, N.C. The first fiber optic adapter 246 may include an adapter sub-assembly 248, adapter housing 250 and an adapter insert 252 with internal threads 254. The first fiber connector 244 is connected to the adapter sub-assembly 248 and positioned in the first fiber optic adapter 246. The second optical fiber interconnection point 242 may include a multi-fiber crimp assembly 256 having a multi-fiber ferrule 258 positioned therein and a coupling nut 260. The second optical fiber interconnection point 242 may be configured to mate with a complementary multi-fiber connector 262. The multi-fiber connector 262 may be an MPO type connector, for example an MTP connector as provided by Corning Optical Communications LLC, of Hickory. N.C. The multi-fiber connector 262 may also be a hardened multi-fiber connector, for example, an OptiTip® connector as provided by Corning Optical Communications LLC, of Hickory, N.C. Like the first interconnection point, the second interconnection point may have any suitable mechanism or structure for securing a mating optical connection.

Figure 7:
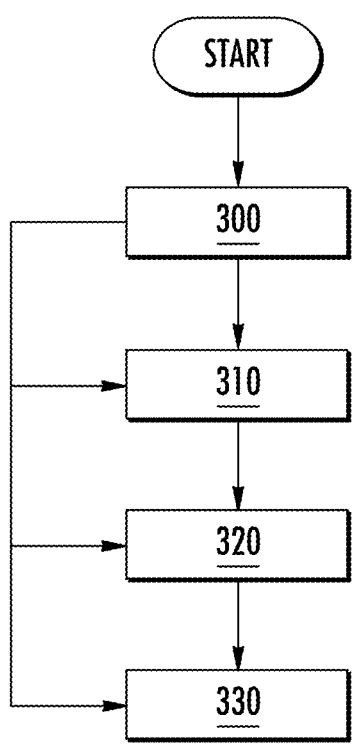
FIG. 7 is a flow-chart diagram illustrating an exemplary method for making a fiber optic connection device.

Referring now to FIG. 7, there is shown a method of making a fiber optic connection device 200. The method may include positioning an optical splitter 216 in a casing 210 having a first end 232 and a second end 234 (block 300 in FIG. 7). The optical splitter 216 has an input 224 proximal to the first end 232 and an output 226 proximal to the second end 234. The method also includes locating a first optical interface 212 adjacent to the first end 232 (block 310 in FIG. 7). The first optical interface 212 is in optical communication with the input 224 of the optical splitter 216, and includes a first optical fiber interconnection point 240. The input 224 of the optical splitter 216 includes at least one first waveguide 218, and the first optical interface 212 is in optical communication with the at least one first waveguide 218. The first optical fiber interconnection point 240 may include internal threads 254 for securing a complementary optical connector, but other suitable securing mechanisms are possible.

The method also includes locating a second optical interface 214 adjacent to the second end 234 (block 320 in FIG. 7). The second optical interface 214 is in optical communication with the output 226 of the optical splitter 216 and includes a second optical fiber interconnection point 242. The second optical fiber interconnection point 242 may include a multi-fiber connector. The output 226 of the optical splitter 216 has a plurality of second waveguides 220 and the second optical interface 214 is in optical communication with the plurality of second waveguides 220. The second optical fiber interconnection point 242 includes internal threads 255 for securing a complementary optical connector, but other suitable securing mechanisms are possible according to the concepts disclosed. The method may also optionally include sealing the casing 210 against environmental elements (block 330 in FIG. 7). The degrees of sealing may depend on the intended environment for the device. By way of explanation, a device intended for outdoor applications would be robustly sealed, whereas a device intended for indoor use or protected within an enclosure may not need the same degree of protection from the environment effects.

Figure 8:
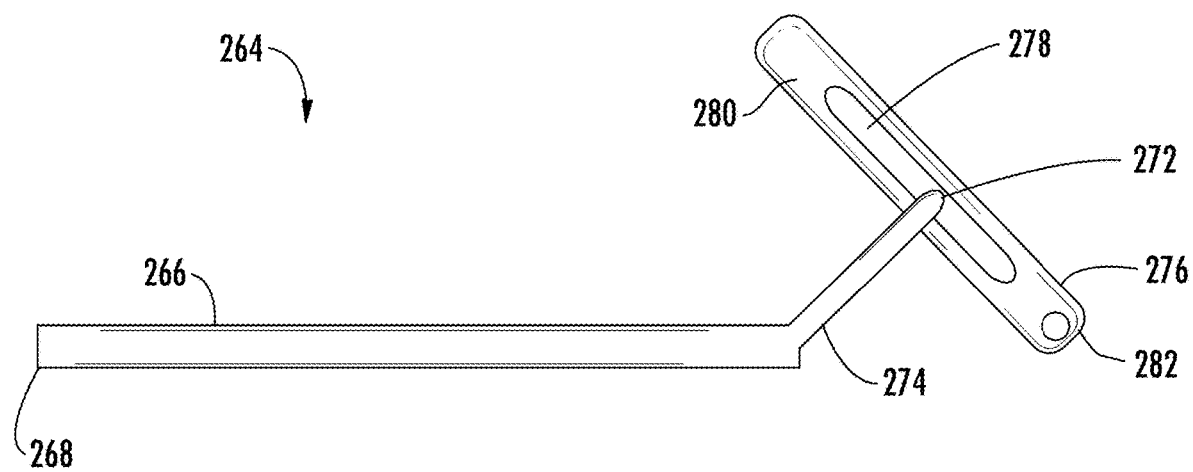
FIG. 8 is a detail view of a bend control compensator of the fiber optic connection device of FIGS. 5 and 6.

Continuing with reference to FIGS. 5 and 6, and also referring to FIG. 8, a bend control compensator 264 may be mounted in the casing 210 adjacent to the first end 232. The bend control compensator 264 includes a crank 266 connected at a first end 268 to an inner shell 270 of first optical fiber interconnection point 240. The inner shell 270 translates longitudinally when an external fiber optic connector is received by the first fiber optic adapter 246. The crank 266 has a second end 272 with an angled arm 274 movably attached to a cam 276 at slot 278 through the side 280 of cam 276. The cam 276 has a first end 282 that is pivotably attached to the inner surface 231 of the casing 210. When an external fiber optic connector is received by the first fiber optic adapter 246, the crank 266 moves with the inner shell 270 operating the cam 276 to control the bending of the first optical fiber 228 as it reacts to the movement of the inner shell 270.

Figure 9:
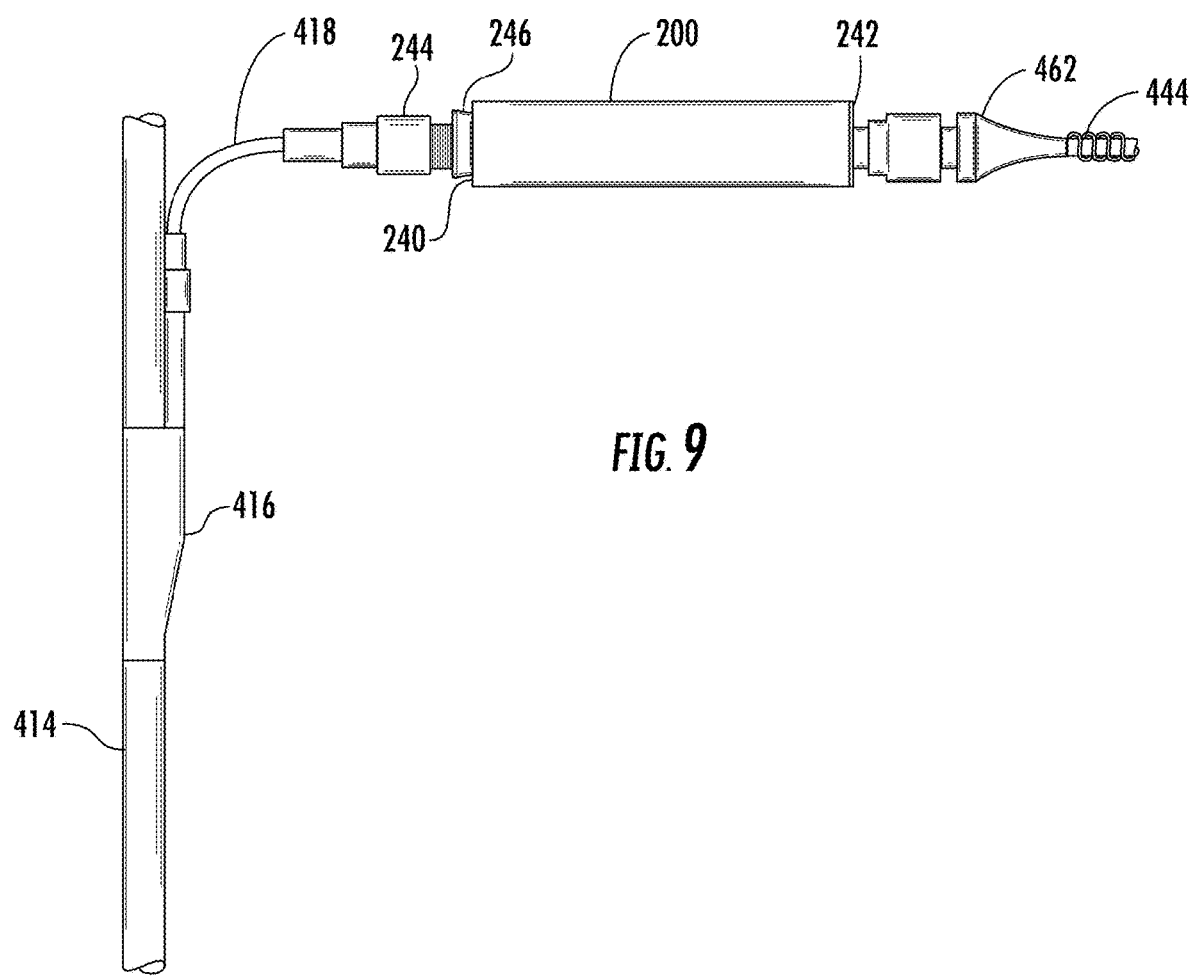
FIG. 9 is a partial elevation view of an access point of a riser cable connected to the fiber optic device of FIG. 4, including a tether cable connected to the first optical fiber connection point and a multi-fiber optical connector connected to the second optical fiber connection point.

FIG. 9 is a partial detail view of a fiber optic connection device 200 connected to the first optical fiber interconnection point 240 by a first fiber connector 244 to a tether cable 418 of an access point 416 of riser cable 414. In FIG. 9, the first fiber connector 244 is shown as a hardened single fiber connector, for example, an OptiTap connector, attached to the end of the tether cable 418. The first fiber connector 244 is received by the first fiber optic adapter 246. The multi-fiber connector 462 terminates a multi-fiber cable 444 and is connected to the second optical fiber interconnection point 242 and mated with the multi-fiber ferrule 258 (not shown in FIG. 9).

Figure 10:
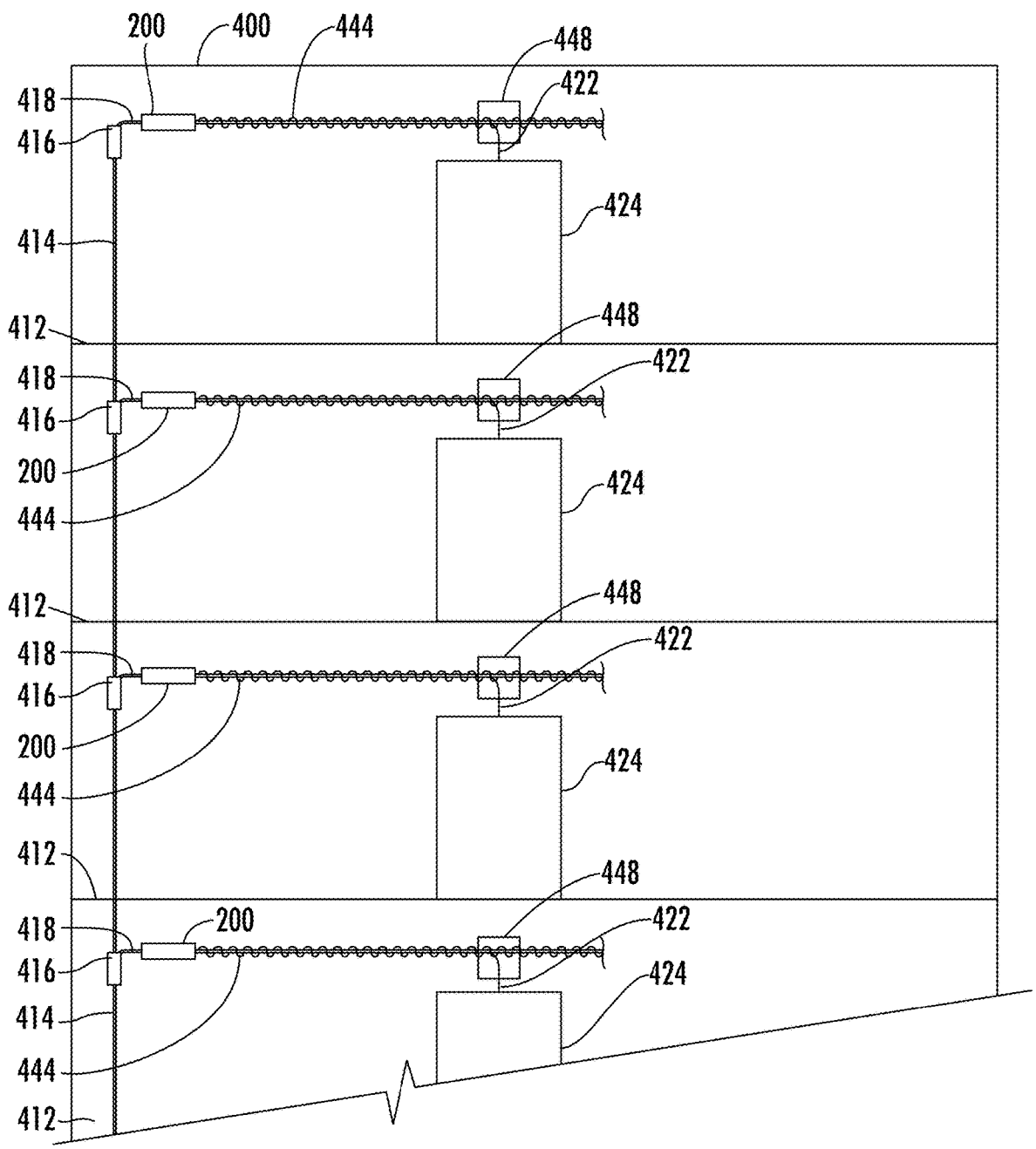
FIG. 10 is a partial elevation view a MDU with a fiber optic network installed therein, including the fiber optic device according to FIG. 4 connected to access points on the riser cable connecting subscriber premises located on several floors to the fiber optic network.

Referring to FIG. 10, there is shown a fiber optic network 400 installed in a typical MDU 410. The MDU 410 has multiple floors or distribution levels 412, four of which are shown in FIG. 10. Each floor 412 is provided optical service by a riser cable 414 extending vertically from a lower floor 412, which may be a basement (not shown in FIG. 10). The riser cable 414 has spaced apart access points 416 which may be set at the factory. In FIG. 10, the access points 416 have been set to align with each floor 412. However, there is no distribution box, whether a FDT or LCP, in the fiber optic network of FIG. 10. Instead, a fiber optic connection device 200 is connected to the riser cable 414 through the tether cable 418 at each floor 412 and 412 and to the subscriber drop cable 422 bundled in a bundled drop cable 444 to provide optical communication service to subscriber premises 424 on each floor 412 through drop box 448. However, the concepts disclosed may be used in other applications such as outdoor environments, industrial applications or other suitable deployments where optical splitters are desired with plug and play connectivity.

The devices disclosed are advantageous since they provide flexibility and scalability for the network operators since the device can be removed or added as needed. Moreover, the device can be easily replaced as needed. Consequently, the network operator has more flexibility for placement of the splitters in the network and to accommodate changes in subscriber take-rates and the like.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic device, comprising:
   a casing having a first end and a second end;
   an optical splitter positioned in the casing and having an input proximal to the first end and an output proximal to the second end;
   a first optical interface located adjacent the first end and in optical communication with the input of the optical splitter, wherein the first optical interface comprises a first optical fiber interconnection point, the first optical fiber interconnection point comprises a translatable inner shell, and the inner shell translates longitudinally in response to the first optical fiber interconnection point receiving a fiber optic connector; and
   a second optical interface located adjacent the second end and in optical communication with the output of the optical splitter, wherein the second optical interface comprises a second optical fiber interconnection point.

2. The fiber optic device of claim 1, wherein the first optical interface is in-line with the second optical interface and face in opposite directions.

3. The fiber optic device of claim 1, wherein the casing is sealed by overmold construction.

4. The fiber optic device of claim 1, wherein the casing is sealed by a potting material disposed in the casing.

5. The fiber optic device of claim 1, wherein the fiber optic connection device is sealed by a heat-shrink material applied over the casing.

6. The fiber optic device of claim 1, wherein the first optical fiber interconnection point comprises a first fiber connector.

7. The fiber optic device of claim 6, wherein the first optical fiber interconnection point comprises a first fiber optic adapter.

8. The fiber optic device of claim 7, wherein the first fiber optic adapter is a hardened adapter having internal threads.

9. The fiber optic device of claim 7, wherein the first fiber connector is positioned in the first fiber optic adapter.

10. The fiber optic device of claim 6, wherein the first fiber connector is a single-fiber connector.

11. The fiber optic device of claim 1, wherein the second optical fiber interconnection point comprises a multi-fiber ferrule.

12. The fiber optic device of claim 11, wherein the second optical fiber interconnection point is configured to mate with a complementary multi-fiber connector.

13. The fiber optic device of claim 12, wherein the multi-fiber connector is an MPO type connector.

14. The fiber optic device of claim 12, wherein the multi-fiber connector is a hardened multi-fiber connector.

15. The fiber optic device of claim 1, wherein the optical splitter comprises an M:N split ratio, wherein M is the number of optical waveguides of the input and N is the number of optical waveguides of the output.

16. The fiber optic device of claim 15, wherein M is one or greater.

17. The fiber optic device of claim 15, wherein N is selected from one of 4, 8, 16 and 32.

18. The fiber optic device of claim 1, wherein the casing is sealed from environmental elements.

19. A fiber optic device, comprising:
    a casing having a longitudinal axis therethrough and an outer surface, the casing comprising a first end and a second end, wherein the first end and the second end are positioned in opposition on the longitudinal axis of the casing;
    an optical splitter positioned in the casing generally aligned with the longitudinal axis between the first end and the second end, and having at least one first waveguide extending from the optical splitter toward the first end, and a plurality of second waveguides extending from the optical splitter toward the second end;
    a single fiber connector accessible through the first end and in optical communication with the at least one first waveguide;
    a multi-fiber connector accessible through the second end and in optical communication with the plurality of second waveguides and;
    a bend control compensator disposed in the casing adjacent to the first end, wherein the bend control compensator controls a bending of the at least one first waveguide when a fiber optic connector is received by the fiber optic device.

20. The fiber optic device of claim 19, further comprising a first optical interface and a second optical interface, wherein the first optical interface is in-line with the second optical interface.

21. The fiber optic device of claim 19, wherein the at least one first waveguide comprises a first optical fiber.

22. The fiber optic device of claim 21, wherein the first optical fiber is ribbonized.

23. The fiber optic device of claim 19, wherein the plurality of second waveguides comprises a second optical fiber.

24. The fiber optic device of claim 23, wherein the second optical fiber comprises multiple optical fibers.

25. The fiber optic device of claim 24, wherein the second optical fiber is ribbonized.

26. The fiber optic device of claim 19, wherein the casing has a maximum outer transverse cross-sectional dimension that is about 40 millimeters or less.

27. The fiber optic device of claim 19, wherein the casing has a maximum length that is about 200 millimeters or less.

28. The fiber optic device of claim 19, wherein the first end has a first outer rim and the second end has a second outer rim.

29. The fiber optic device of claim 28, wherein at least one of the first outer rim and the second outer rim is curved radially inwardly toward the longitudinal axis.

30. The fiber optic device of claim 28, wherein the first outer rim and the second outer rim are curved radially inward toward the longitudinal axis.

31. A fiber optic device, comprising:
    a casing having a longitudinal axis therethrough, an outer surface and an inner surface, the casing comprising a first end and a second end;
    an optical splitter positioned in the casing generally aligned with the longitudinal axis, and having at least one first optical fiber extending from the optical splitter toward the first end, and a plurality of second optical fibers extending from the optical splitter toward the second end;

at least one first optical interface located adjacent the first end and in optical communication with the first optical fiber, wherein the first optical interface comprises a first optical fiber interconnection point;

a second optical interface located adjacent the second end and in optical communication with the plurality of second optical fibers, wherein the second optical interface comprises a second optical fiber interconnection point; and a bend control compensator disposed in the casing adjacent the first end, wherein the bend control compensator controls a bending of the at least one first waveguide when a fiber optic connector is received by the fiber optic device.

32. The fiber optic device of claim 31, wherein the first optical fiber interconnection point comprises a translatable inner shell, and wherein the inner shell translates longitudinally in response to the first optical fiber interconnection point receiving a fiber optic connector.

33. The fiber optic device of claim 32, wherein the bend control compensator comprises crank having a first end and a second end, and wherein the first end of the crank is connected to the inner shell and is translated in response to the inner shell, and wherein the second end of the crank is movably connected to a cam.

34. The fiber optic device of claim 33, wherein the cam is pivotally connected to the inner surface of the casing.

35. The fiber optic device of claim 34, wherein the cam controls bending of the at least first optical fiber in response to the inner shell.

36. A method of making a fiber optic device, comprising:
positioning an optical splitter in a casing having a first end and a second end, wherein the optical splitter has an input proximal to the first end and an output proximal to the second end;

locating a first optical interface adjacent to the first end, wherein:
the first optical interface is in optical communication with the input of the optical splitter,
the first optical interface comprises a first optical fiber interconnection point,
the first optical fiber interconnection point comprises a translatable inner shell, and
the inner shell translates longitudinally in response to the first optical fiber interconnection point receiving a fiber optic connector;

locating a second optical interface adjacent to the second end, wherein the second optical interface is in optical communication with the output of the optical splitter, and wherein the second optical interface comprises a second optical fiber interconnection point; and locating a bend control compensator in the casing adjacent the first end, wherein the bend control compensator comprises crank having a first end and a second end, the first end of the crank is connected to the inner shell and is translated in response to the inner shell, and the second end of the crank is movably connected to a cam.

37. The method of claim 36, wherein the input of the optical splitter comprises at least one first waveguide, and wherein the first optical interface is in optical communication with the at least one first waveguide.

38. The method of claim 36, wherein the output of the optical splitter has a plurality of second waveguides, and wherein the second optical interface is in optical communication with the plurality of second waveguides.

39. The method of claim 36, wherein the first optical fiber interconnection point further comprises internal threads for securing a complementary optical connector.

40. The method of claim 36, wherein the first optical fiber interconnection point comprises a single fiber connector.

41. The method of claim 36, wherein the second optical fiber interconnection point further comprises internal threads for securing a complementary optical connector.

42. The method of claim 36, wherein the second optical fiber interconnection point comprises a multi-fiber connector.

43. The method of claim 36, further comprising sealing the casing from environmental elements.

* * * * *